US008698788B2

(12) United States Patent
Kitagawa

(10) Patent No.: US 8,698,788 B2
(45) Date of Patent: Apr. 15, 2014

(54) DISPLAY APPARATUS AND DISPLAY APPARATUS DRIVING METHOD

(75) Inventor: Daiji Kitagawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 163 days.

(21) Appl. No.: 13/376,415

(22) PCT Filed: May 18, 2010

(86) PCT No.: PCT/JP2010/058389
§ 371 (c)(1), (2), (4) Date: Dec. 6, 2011

(87) PCT Pub. No.: WO2010/143501
PCT Pub. Date: Dec. 16, 2010

(65) Prior Publication Data

US 2012/0086688 A1 Apr. 12, 2012

(30) Foreign Application Priority Data

Jun. 9, 2009 (JP) ................................ 2009-138559

(51) Int. Cl.
*G06F 3/038* (2013.01)
*G09G 5/00* (2006.01)

(52) U.S. Cl.
USPC ......................... 345/209; 345/211; 315/169.3

(58) Field of Classification Search
USPC ....................... 345/209, 55, 76, 87, 208, 211; 315/169.3
See application file for complete search history.

(56) References Cited

U.S. PATENT DOCUMENTS

| | | | | |
|---|---|---|---|---|
| 7,777,737 | B2 * | 8/2010 | Akutsu et al. | 345/209 |
| 2005/0036078 | A1 | 2/2005 | Tsunashima et al. | |
| 2007/0057887 | A1 | 3/2007 | Itakura et al. | |
| 2008/0231569 | A1 | 9/2008 | Yamazaki et al. | |
| 2009/0219237 | A1 * | 9/2009 | Yamazaki | 345/84 |
| 2010/0315405 | A1 | 12/2010 | Tanaka | |

FOREIGN PATENT DOCUMENTS

| | | | |
|---|---|---|---|
| JP | 2003295157 | A | 10/2003 |
| JP | 2005049849 | A | 2/2005 |
| JP | 2007052290 | A | 3/2007 |
| JP | 2008015478 | A | 1/2008 |
| JP | 2008145837 | A | 6/2008 |
| JP | 2009086170 | A | 4/2009 |
| WO | WO-2009128281 | A1 | 10/2009 |

* cited by examiner

*Primary Examiner* — Kevin M Nguyen
*Assistant Examiner* — Kenneth B Lee, Jr.
(74) *Attorney, Agent, or Firm* — Harness, Dickey & Pierce, P.L.C.

(57) ABSTRACT

During the first frame, a first common electric potential is used, all picture elements of an identical line have an identical write polarity, there is another line of picture elements having a write polarity different from the identical write polarity, a data signal having a first electric potential lower than the first common electric potential is supplied to a line for a negative write polarity, a picture element electrode electric potential is changed to a second electric potential greater than a second common electric potential and lower than the first common electric potential by changing a storage capacitor electric potential from Low to High after a selection period ends, a data signal having a third electric potential greater than the first common electric potential is supplied to a line for a positive write polarity, and the storage capacitor electric potential is still kept Low after the selection period ends.

4 Claims, 7 Drawing Sheets

DISPLAY APPARATUS AND DISPLAY APPARATUS DRIVING METHOD

TECHNICAL FIELD

The present invention relates to a display device for driving storage capacitor wirings.

BACKGROUND ART

A liquid crystal display device that carries out an AC driving such as a gate line reverse driving in which polarities of display data in an identical line are identical to each other has an advantage of increasing a liquid crystal applied voltage while narrowing a data signal electric potential range, by individually driving storage capacitor wirings provided in respective lines.

FIG. 6 shows an example of an equivalent circuit of a picture element PIX included in such a liquid crystal display device for driving the storage capacitor wirings.

The picture element PIX includes a TFT 101 that serves as a selection element of the picture element PIX, a liquid crystal capacitor CL, and a storage capacitor Cs. A gate, a source, and a drain of the TFT 101 are connected to a gate line GL, a source line SL, and a picture element electrode 102, respectively. The liquid crystal capacitor CL is defined by the picture electrode 102, a common electrode COM, and a liquid crystal layer provided between the picture element electrode 102 and the common electrode COM. The storage capacitor Cs is defined by the picture element 102, a storage capacitor wiring CSL, and an insulating film provided between the picture element electrode 102 and the storage capacitor wiring CSL. A common electric potential Vcom is applied to the common electrode COM, and a storage capacitor electric potential Vcs of High level or Low level is applied to the storage capacitor wiring CSL. The picture element PIX includes a parasitic capacitor such as a parasitic capacitor Cgd formed between the picture element electrode 102 and a scanning signal line GL (the gate line GL).

In the picture element PIX, a data signal electric potential is written in the picture element electrode 102 while the TFT 101 is being active, and then the TFT 101 is made inactive. Thereafter, the storage capacitor electric potential Vcs to be applied to the storage capacitor wiring CSL allocated to the picture element PIX is changed from Low level to High level. This causes a picture element electrode electric potential Vdr to be raised from V+ to V+' via the storage capacitor Cs, as shown in FIG. 7. Accordingly, a liquid crystal applied voltage VLC+ having a sufficiently great positive polarity can be obtained even in a case where a supplied data signal electric potential for display of positive polarity is low, provided that the common electric potential Vcom, the storage capacitor Cs and the storage capacitor electric potential Vcs are set such that the picture element electrode electric potential Vdr that has become V+' by a raise of ΔV+ moves away from the common electric electrode Vcom toward a positive direction. Note that the V+ is determined in accordance with a gray scale level, and should not necessarily be lower than the common electric potential Vcom.

Further, in a case where (i) the data signal electric potential is written in the picture element electrode 102, (ii) the TFT 101 is made inactive and then (iii) the storage capacitor electric potential Vcs is changed from High level to Low level, the picture element electrode electric potential Vdr is decreased from V− to V−' via the storage capacitor Cs. Accordingly, a liquid crystal applied voltage VLC− having a sufficiently great negative polarity can be obtained even in a case where a supplied data signal electric potential for display of negative polarity is great, provided that the storage capacitor Cs and the storage capacitor electric potential Vcs are set such that the picture element electrode electric potential Vdr that becomes V−' by a decrease of ΔV− moves away from the common electric potential Vcom toward a negative direction. Note that the V− is determined in accordance with a gray scale level, and should not necessarily be greater than the common electric potential Vcom.

It is accordingly possible to further narrow a whole data signal electric potential range Vrange including a range of a data signal electric potential for display of positive polarity and a range of a data signal electric potential for display of negative polarity than a case where the picture element electrode electric potential Vdr obtained by writing, in the picture element PIX, the data signal electric potential for display of positive polarity and the data signal electric potential for display of negative polarity that are distributed via the common electric potential Vcom is used as it is. This makes it possible to reduce a power supply voltage that generates a gray scale reference voltage, thereby attaining low power consumption of the liquid crystal display device and driving of the liquid crystal display device at a high frequency.

CITATION LIST

Patent Literature

Patent Literature 1
Japanese Patent Application Publication, Tokukai No. 2005-49849 A (Publication Date: Feb. 24, 2005)

SUMMARY OF INVENTION

Technical Problem

However, the conventional liquid crystal display device causes a problem of deteriorating a display quality when the conventional liquid crystal display device is turned on. The following describes the problem.

FIG. 8 shows operation waveforms of the liquid crystal display device, which are obtained on startup.

It is assumed that the liquid crystal display device is a normally black liquid crystal display device in which a gate line reverse driving is carried out. FIG. 8 shows driving waveforms of respective lines from power turn-on of the liquid crystal display device to the second frame.

Firstly, the liquid crystal display device is turned on at a time t0. After a power turn-on period Tb has elapsed, a control signal s0 is activated at a time t1. The activation of the control signal s0 causes a shift to a display period during which source outputs to data signal output terminals of a source driver are carried out for each horizontal period. A power supply causes a storage capacitor power supply electric potential Ecs and a common electric potential Vcom to have respective rising edges at the time t1.

In the display period, a first frame F1 starts at the time t1. During the first frame F1, display data to be written into picture elements PIX which belong to a first line is transformed, in accordance with a data signal electric potential polarity POL, into positive display data, and a polarity of display data is alternately reversed, on and after a second line, between any adjacent two lines. For successive frames following the first frame F1, polarities of display data which are to be written in respective picture elements PIX in each line are alternately reversed between (i) during one of any adjacent frames and (ii) during the other of any adjacent frames.

As described above, the liquid crystal display device 1 is a normally black liquid crystal display device. Therefore, all of the picture elements PIX display black up. As described above, the liquid crystal display device is a normally black liquid crystal display device. Therefore, a data signal electric potential Vda for black display of positive polarity and a data signal electric potential Vda for black display of negative polarity are supplied as display data to the picture elements PIX from initiation of the display period to a predetermined frame.

A picture element electrode 102 is electrically connected to a GND until the time t0 when the liquid crystal display device is turned on, via a TFT 101 which is in high-impedance, a source line SL, and an output from a source driver which is in high-impedance. Therefore, the picture element electrode 102 has an electric potential substantially equal to a GND electric potential. At the time t1, the common electric potential Vcom is raised, and a gate high electric potential Vgh is supplied as a scanning signal Vg1 to a gate line GL of the first line. This causes a data signal electric potential Vda (for example, 0.2V) for black display of positive polarity to be written in the picture element electrode 102. Though, as shown in FIG. 7, a picture element electrode electric potential Vdr obtained by writing of the data signal electric potential Vda indicates V+ (for example, 0.2 V) that is lower than raised common electric potential Vcom (for example, 2V), a storage capacitor electric potential Vcs1 to be applied to a storage capacitor wiring CSL1 of the first line changes from Low level (Vcs1) to High level (Vcsh) when the scanning signal Vg1 is decreased to a gate low electric potential Vg1 so that writing of the data signal electric potential Vda ends. This change causes a picture element electrode electric potential Vdr1 to be raised by ΔV+ (for example, 2V) to indicate V+' (for example, 2.2 V) that is greater than the common electric potential Vcom. An electric potential difference (0.2 V=(V+')−Vcom) between the picture element electrode electric potential Vdr1 and the common electric potential Vcom becomes a liquid crystal applied voltage VLC+ which is a black display level. This allows black display to be carried out with respect to the first line.

For a successive horizontal period of FIG. 8, the gate high electric potential Vgh is supplied as a scanning signal Vg2 to a gate line GL2 of the second line. This causes a data signal electric potential Vda (for example, 3.8 V) for black display of negative polarity to be written in the picture element electrode 102. The picture element electrode electric potential Vdr obtained by writing of the data signal electric potential Vda indicates V− (for example, 3.8 V) that is greater than raised common electric potential Vcom (for example, 2V), as shown in FIG. 7. When the scanning signal Vg1 is decreased to the gate low electric potential Vg1 so that the writing of the data signal electric potential Vda ends, the storage capacitor electric potential Vcs1, to be applied to the storage capacitor wiring CSL1 of the second line, keeps Low level (Vcs1: that is, GND electric potential). Therefore, the liquid crystal applied voltage (VLC1−) becomes a positive voltage, 1.8 V ((V−)−Vcom) as shown in FIG. 7, which is different from the liquid crystal applied voltage VCL− obtained in a case of a normal operation.

Subsequently, for each horizontal period, the data signal electric potential of the picture elements PIX which belong to the odd-numbered lines are written in the same manner as the data signal electric potential of the picture elements PIX which belong to the first line, and the data signal electric potential of the picture elements PIX which belong to even-numbered lines are also written in the same manner as the data signal electric potential of the picture elements PIX which belong to the second line.

The second frame F2 starts at the time t2. In a case where during the second frame F2, the data signal for black display is supplied as with during the first frame F1, the data signal electric potential Vda for display of negative polarity is written in the picture elements PIX of the odd-numbered lines, and the data signal electric potential Vda for display of positive polarity is written in the picture elements PIX of the even-numbered lines.

As to writing of the data signal electric potential Vda for display of negative polarity, when the scanning signal Vg1 is decreased to the gate low electric potential Vg1 so that the writing of the data signal electric potential Vda ends, the storage capacitor electric potential Vcs to be applied to the storage capacitor wiring CSL changes from High level (Vcsh) to Low level (Vcs1). This change causes the picture element electrode electric potential Vdr to be decreased by ΔV− (for example, 2V), as shown in FIG. 7, to indicate V−' (for example, 1.8 V) that is lower than the common electric potential Vcom (for example, 2V). An electric potential difference (0.2 V=Vcom−(V−')) between the picture element electrode electric potential Vdr1 and the common electric potential Vcom becomes the liquid crystal applied voltage VLC− which is a black display level. This allows black display to be carried out.

For successive frames following the second frame, a display identical to that carried out during the second frame F2 is carried out while the polarities of display data are alternately reversed for each frame.

However, in the picture elements PIX in each of which the data signal electric potential Vda for black display of negative polarity is written during the first frame F1, the storage capacitor electric potential Vcs has kept Low level (Vcs1=GND electric potential) since the liquid crystal display device is turned on. It is accordingly impossible to change the storage capacitor electric potential Vcs from High level to Low level so as to decrease the picture element electrode electric potential Vdr. The liquid crystal applied voltage VLC1− of the picture element PIX in which the data signal electric potential for display of negative polarity is written is as great as 1.8 V. Therefore, the picture element PIX actually displays gray color. Consequently, a display screen shows black and gray stripes thereon during the first frame F1, as shown in FIG. 9. The display screen visually flashes for a moment. This causes a deterioration in display quality.

Patent Literature 1 discloses a technique for eliminating stripes that occur prior to the first frame. However, the technique of Patent Literature 1 cannot eliminate the stripes that occur during the first frame.

As described above, the conventional liquid crystal display device for driving the storage capacitor wirings has a problem of deteriorating its display quality when the conventional liquid crystal display device is turned on.

The present invention was made in view of the problem, and an object of the present invention is to provide (i) a display device capable of preventing the deterioration in its display quality when the display device is turned on, and (ii) a method for driving the display device.

Solution to Problem

In order to attain the object, a display device of the present invention is an active matrix display device, including storage capacitor wirings in each of which a storage capacitor electric potential is switched between High level and Low level for each frame, the active matrix display device being capable of switching a common electric potential between a first common electric potential and a second common electric potential, the first common electric potential being greater than the second common electric potential, during the first frame where the storage capacitor electric potential is initially Low level after the active matrix display device is turned on:

(i) the first common electric potential being used as the common electric potential, and data signals being supplied to picture elements such that (a) all the picture elements which belong to an identical line in which line data signals, to be written into the picture elements, have an identical first write polarity with respect to the first common electric potential and (b) there is another line to which picture elements belong and in which line data signals, to be written into the picture elements, have a second write polarity, different from the identical first write polarity, with respect to the first common electric potential, (ii) a picture element electrode electric potential of picture elements for a negative write polarity with respect to the first common electric potential, which picture elements belong to a line, being changed to a second electric potential that is greater than the second common electric potential and that is lower than the first common electric potential, by (a) supplying, to the picture elements of the line, data signals, which have a first electric potential that is lower than the first common electric potential and (b) changing the storage capacitor electric potential of a corresponding storage capacitor wiring from Low level to High level after a selection period of selecting the picture elements for the negative write polarity ends, and (iii) (a) data signals, which have a third electric potential that is greater than the first common electric potential, being supplied to picture elements for a positive write polarity with respect to the first common electric potential, which picture elements belong to a line and (b) the storage capacitor electric potential of the corresponding storage capacitor wiring being kept to be Low level after the selection period of selecting the picture elements for the positive write polarity ends.

According to the present invention, the picture element electrode electric potential of the picture elements for a negative write polarity with respect to the first common electric potential, which picture elements belong to the line, becomes the first electric potential during the selection period. The first electric potential is set lower than the first common electric potential. When the selection period ends, the storage capacitor electric potential is changed from Low level to High level. The change in the storage capacitor electric potential causes the picture element electrode electric potential to be raised to become the second electric potential. The second electric potential is lower than the first common electric potential. An electric potential difference between the picture element electrode electric potential and the first common electric potential becomes a liquid crystal applied voltage having a negative write polarity with respect to the first common electric potential. This allows a display to be carried out during the first frame.

The picture element electrode electric potential of the picture elements for the positive write polarity with respect to the first common electric potential, which picture elements belong to the line, becomes the third electric potential by supply of the data signal electric potential during the selection period. The third electric potential is set greater than the first common electric potential. When the selection period ends, the storage capacitor electric potential still keeps Low level. Therefore, the picture element electrode electric potential is not subjected to any decrease. An electric potential difference between the picture element electrode electric potential and the common electric potential becomes a liquid crystal applied voltage having a positive write polarity with respect to the first common electric potential. This allows a display to be carried out during the first frame.

Accordingly, even in a case where the storage capacitor electric potential cannot change from High level to Low level during the first frame, the liquid crystal applied voltage, which has the positive write polarity with respect to the first common electric potential, has a value approximate to that of the liquid crystal applied voltage having the negative write polarity with respect to the first common electric potential. This is because the first common electric potential is set, as a common electric potential, between the second electric potential and the third electric potential. Therefore, conventionally, lines to which data signal electric potentials having different polarities have been given actually result in having an identical write polarity, so that the picture element electrode electric potential that corresponds to the data signal electric potential having one of the positive and negative polarities is greatly distant from the common electric potential. In contrast, the display device of the present invention can avoid this kind of problem.

It is accordingly possible to prevent stripes from being displayed on a display screen during the first frame. This brings about an effect of producing a display device capable of preventing a deterioration in display quality of the display device, which deterioration is caused when the display device is turned on.

In order to attain the object, a method for driving a display device of the present invention is a method for driving an active matrix display device, the active matrix display device, including storage capacitor wirings in each of which a storage capacitor electric potential is switched between High level and Low level for each frame, said method including the steps of:

causing the active matrix display device to be capable of switching a common electric potential between a first common electric potential and a second common electric potential, the first common electric potential being greater than the second common electric potential, during the first frame where the storage capacitor electric potential is initially Low level after the active matrix display device is turned on:

(i) causing the first common electric potential to be used as the common electric potential, and causing data signals to be supplied to picture elements such that (a) all the picture elements which belong to an identical line in which line data signals, to be written into the picture elements, have an identical first write polarity with respect to the first common electric potential and (b) there is another line to which picture elements belong and in which line data signals, to be written into the picture elements, have a second write polarity, different from the identical first write polarity, with respect to the first common electric potential, (ii) causing a picture element electrode electric potential of picture elements for a negative write polarity with respect to the first common electric potential, which picture elements belong to a line, to be changed to a second electric potential that is greater than the second common electric potential and that is lower than the first common electric potential, by (a) supplying, to the picture elements of the line, data signals, which have a first electric potential that is lower than the first common electric potential and (b) changing the storage capacitor electric potential of a corresponding storage capacitor wiring from Low level to High level after a selection period of selecting the picture elements for the negative write polarity ends, and (iii) (a) causing data signals, which have a third electric potential that is greater than the first common electric potential, to be supplied to picture elements for a positive write polarity with respect to the first common electric potential, which picture elements belong to a line and (b) causing the picture element electrode electric potential of the corresponding storage capacitor wiring to be kept to be Low level after the selection period of selecting the picture elements for the positive write polarity ends.

According to the present invention, the picture element electrode electric potential of the picture elements for the negative write polarity with respect to the first common electric potential, which picture elements belong to the line, becomes the first electric potential during the selection period. The first electric potential is set lower than the first common electric potential. When the selection period ends, the storage capacitor electric potential is changed from Low level to High level. The change in the storage capacitor electric potential causes the picture element electrode electric potential to be raised to become the second electric potential. The second electric potential is lower than the first common electric potential. An electric potential difference between the picture element electrode electric potential and the first common electric potential becomes a liquid crystal applied voltage having a negative write polarity with respect to the first common electric potential. This allows a display to be carried out during the first frame.

The picture element electrode electric potential of the picture elements for the positive write polarity with respect to the first common electric potential, which picture elements belong to the line, becomes the third electric potential by supply of the data signal electric potential during the selection period. The third electric potential is set greater than the first common electric potential. When the selection period ends, the storage capacitor electric potential still keeps Low level. Therefore, the picture element electrode potential is not subjected to any decrease. An electric potential difference between the picture element electrode electric potential and the common electric potential becomes a liquid crystal applied voltage having a positive write polarity with respect to the first common electric potential. This allows a display to be carried out during the first frame.

Accordingly, even in a case where the storage capacitor electric potential cannot change from High level to Low level during the first frame, the liquid crystal applied voltage, which has the positive write polarity with respect to the first common electric potential, has a value approximate to that of the liquid crystal applied voltage having the negative write polarity with respect to the first common electric potential. This is because the first common electric potential is set, as a common electric potential, between the second electric potential and the third electric potential. Therefore, conventionally, lines to which data signal electric potentials having different polarities have been given actually result in having an identical write polarity, so that the picture element electrode electric potential that corresponds to the data signal electric potential having one of the positive and negative polarities is greatly distant from the common electric potential. In contrast, the display device of the present invention can avoid this kind of problem.

It is accordingly possible to prevent stripes from being displayed on a display screen during the first frame. This brings about an effect of attaining a method for driving a display device capable of preventing a deterioration in display quality of the display device, which deterioration is caused when the display device is turned on.

Advantageous Effects of Invention

As described above, a display device of the present invention is an active matrix display device, including storage capacitor wirings in, each of which a storage capacitor electric potential is switched between High level and Low level for each frame, the active matrix display device being capable of switching a common electric potential between a first common electric potential and a second common electric potential, the first common electric potential being greater than the second common electric potential, during the first frame where the storage capacitor electric potential is initially Low level after the active matrix display device is turned on:

(i) the first common electric potential being used as the common electric potential, and data signals being supplied to picture elements such that (a) all the picture elements which belong to an identical line in which line data signals, to be written into the picture elements, have an identical first write polarity with respect to the first common electric potential and (b) there is another line to which picture elements belong and in which line data signals, to be written into the picture elements, have a second write polarity, different from the identical first write polarity, with respect to the first common electric potential, (ii) a picture element electrode electric potential of picture elements for a negative write polarity with respect to the first common electric potential, which picture elements belong to a line, being changed to a second electric potential that is greater than the second common electric potential and that is lower than the first common electric potential, by (a) supplying, to the picture elements of the line, data signals, which have a first electric potential that is lower than the first common electric potential and (b) changing the storage capacitor electric potential of a corresponding storage capacitor wiring from Low level to High level after a selection period of selecting the picture elements for the negative write polarity ends, and (iii) (a) data signals, which have a third electric potential that is greater than the first common electric potential, being supplied to picture elements for a positive write polarity with respect to the first common electric potential, which picture elements belong to a line and (b) the storage capacitor electric potential of the corresponding storage capacitor wiring being kept to be Low level after the selection period of selecting the picture elements for the positive write polarity ends.

It is consequently possible to produce a display device capable of preventing a deterioration in display quality of the display device, which deterioration is caused when the display device is turned on.

As described above, a method for driving a display device of the present invention is a method for driving an active matrix display device, the active matrix display device, including storage capacitor wirings in each of which a storage capacitor electric potential is switched between High level and Low level for each frame, said method including the steps of:

causing the active matrix display device to be capable of switching a common electric potential between a first common electric potential and a second common electric potential, the first common electric potential being greater than the second common electric potential, during the first frame where the storage capacitor electric potential is initially Low level after the active matrix display device is turned on:

(i) causing the first common electric potential to be used as the common electric potential, and causing data signals to be supplied to picture elements such that (a) all the picture elements which belong to an identical line in which line data signals, to be written into the picture elements, have an identical first write polarity with respect to the first common electric potential and (b) there is another line to which picture elements belong and in which line data signals, to be written into the picture elements, have a second write polarity, different from the identical first write polarity, with respect to the first common electric potential, (ii) causing a picture element electrode electric potential of picture elements for a negative write polarity with respect to the first common electric potential, which picture elements belong to a line, to be changed to a second electric potential that is greater than the second common electric potential and that is lower than the first common electric potential, by (a) supplying, to the picture elements of the line, data signals, which have a first electric potential that is lower than the first common electric potential and (b) changing the storage capacitor electric potential of a corresponding storage capacitor wiring from Low level to High level after a selection period of selecting the picture elements for the negative write polarity ends, and (iii) (a) causing data signals, which have a third electric potential that is greater than the first common electric potential, to be supplied to picture elements for a positive write polarity with respect to the first common electric potential, which picture elements belong to a line and (b) causing the picture element electrode electric potential of the corresponding storage capacitor wiring to be kept to be Low level after the selection period of selecting the picture elements for the positive write polarity ends.

It is consequently possible to attain a method for driving a display device capable of preventing a deterioration in display quality of the display device, which deterioration is caused when the display device is turned on.

DESCRIPTION OF EMBODIMENTS

The following describes an embodiment of the present invention with reference to FIGS. 1 through 5.

Figure 3:
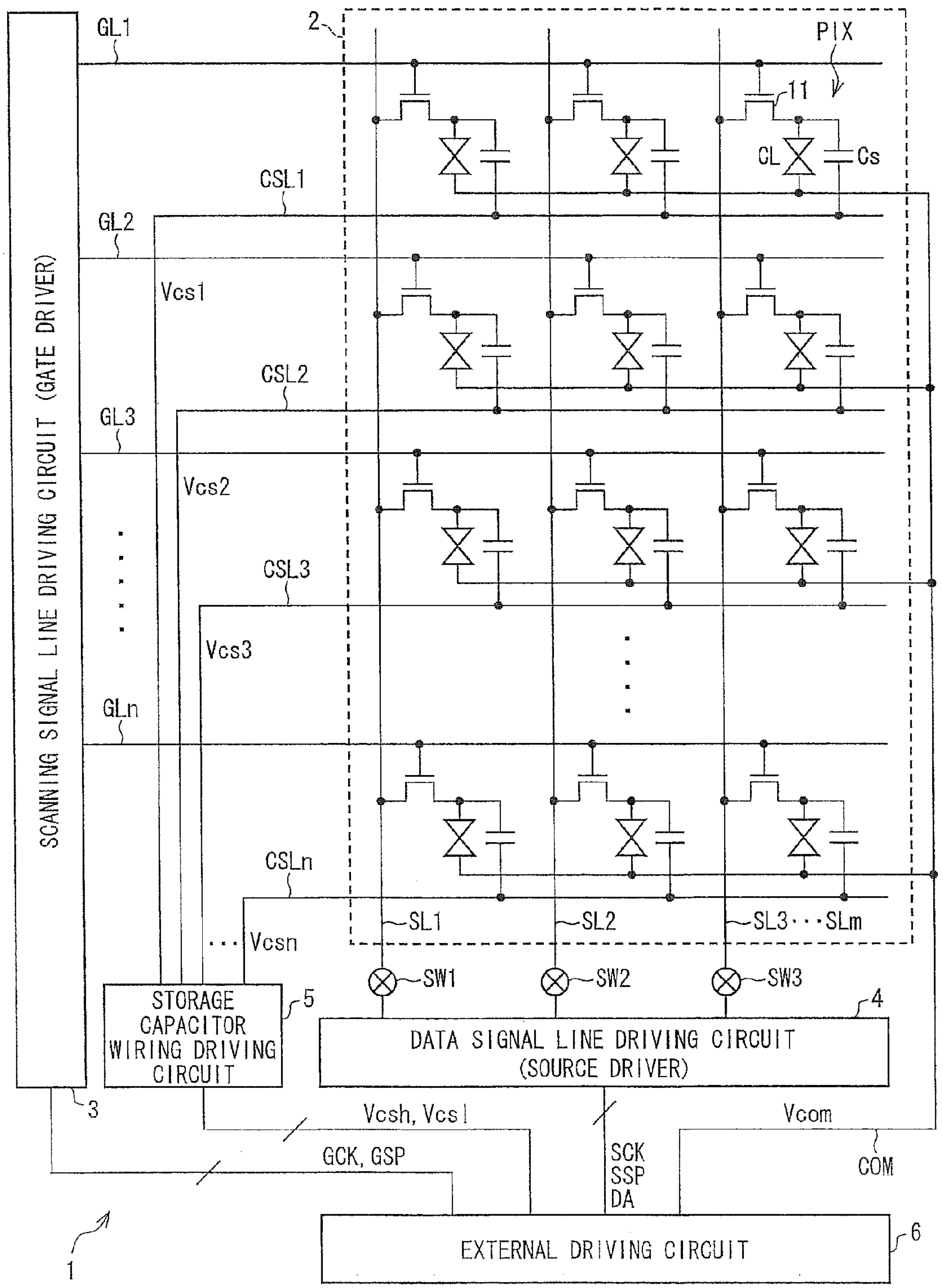
FIG. 3 is a block diagram showing a configuration of a display device in accordance with an embodiment of the present invention.
Figure 4:
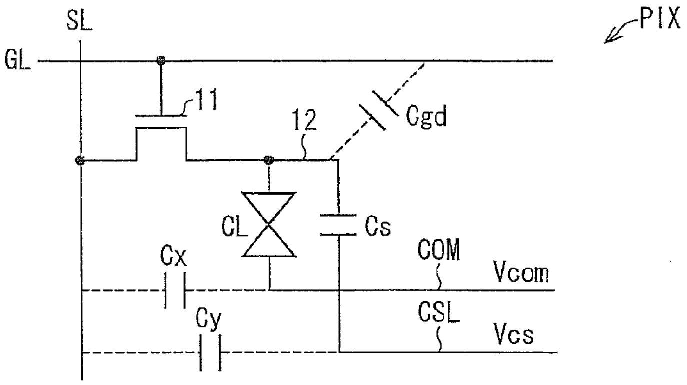
FIG. 4 is a circuit diagram showing a configuration of a picture element included in the display device of FIG. 1.

FIG. 3 shows a configuration of a liquid crystal display device (display device) 1 in accordance with the present embodiment.

The liquid crystal display device 1, which is an active matrix display device, includes a display section 2, a gate driver 3 serving as a scanning signal line driving circuit, a source driver 4 serving as a data signal line driving circuit, a storage capacitor wiring driving circuit 5, the gate driver 3, the source driver 4, the storage capacitor wiring driving circuit 5, and an external driving circuit 6 for controlling driving of a common electrode COM. The liquid crystal display device 1 employs an AC driving, and specifically, carries out a gate line inversion driving. The liquid crystal display device 1 also carries out, for each of storage capacitor wirings CSL, a driving in which (i) a storage capacitor electric potential Vcs which is applied to the storage capacitor wiring CSL (later described) during a period during which positive data is supplied to a panel of the liquid crystal display device 1 and (ii) the storage capacitor electric potential Vcs which is applied to the storage capacitor wiring CSL during a period during which negative data is applied to the panel of the liquid crystal display device 1, have respective polarities reversed to each other.

The display section 2 includes gate lines GL (GL1 through GLn) serving as a plurality of scanning signal lines (n scanning signal lines), source lines SL (SL1 through SLm) serving as a plurality of data signal lines (m data signal lines) that intersect with the gate lines GL, and a plurality of picture elements PIX (n×m picture elements PIX) which are provided for respective intersections of the gate lines GL and the source lines SL. The display device 2 also includes storage capacitor wirings CSL (CSL1 through CSLn) provided parallel to the respective gate lines GL. Each of the storage capacitor wirings CSL is allocated to a corresponding one of picture element lines each of which is made up of m picture elements PIX aligned in the parallel direction.

Figure 6:
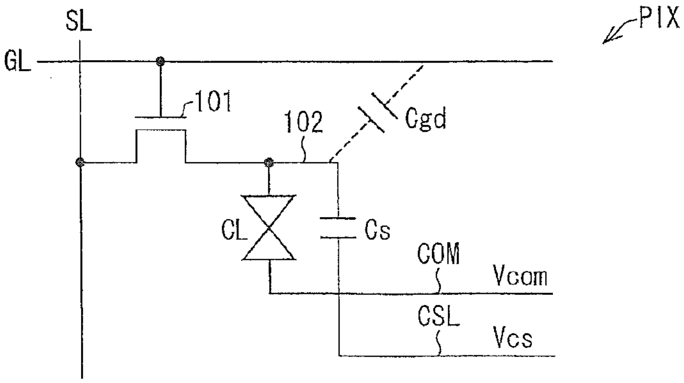
FIG. 6 is a circuit diagram showing a configuration of a picture element included in a conventional display device.

The plurality of picture elements PIX constitute a picture element array in which the plurality of picture elements PIX are arranged in a matrix manner. Each of the plurality of picture elements PIX includes a TFT 11, a liquid crystal capacitor CL, and a storage capacitor Cs (see FIG. 4). A gate, a source, and a drain of the TFT 11 are connected to a gate line GL, a source line SL and a picture element electrode 12, respectively. The liquid crystal capacitor CL is defined by the picture electrode 12, the common electrode COM, and a liquid crystal layer provided between the picture element electrode 12 and the common electrode COM. The storage capacitor Cs is defined by the picture element 12, the storage capacitor wiring CSL, and an insulating film provided between the picture element electrode 12 and the storage capacitor wiring CSL. The common electrode COM receives a common electric potential Vcom generated in a power supply circuit included in the external driving circuit 6. The power supply circuit can selectively output, to the common electrode COM, a first common electric potential Vcom1 or a second common electric potential Vcom2 (later described) that serve as the common electric potential Vcom. Such a selection is made, for example, by causing a switch circuit to carry out switching in such a manner that an output of the first common electric potential Vcom1 is connected to the common electrode COM or an output of the second common electric potential Vcom2 is connected to the common electrode COM. The storage capacitor wirings CSL receives the storage capacitor electric potential Vcs, which is generated, for each of the storage capacitor wirings CSL, by the storage capacitor wiring driving circuit 5 based on the High level voltage Vcsh and the Low level voltage Vcs1 that are (i) generated by the power supply circuit and then (ii) supplied to the storage capacitor wiring driving circuit 5. The voltage Vcsh and the voltage Vcs1 are switched for each frame so that they are alternately supplied to each of the storage capacitor wiring CSL. A picture element capacitor is made up of the liquid crystal capacitor CL, the storage capacitor Cs, and other capacitors. Such other capacitors encompass a parasitic capacitor Cgd defined by the picture element electrode 12 and the gate line GL, a parasitic capacitor Cx defined by the common electrode COM and the source line SL, a parasitic capacitor Cy defined by the storage capacitor wiring CSL, and the source line SL. Note that the parasitic capacitors Cx and Cy are also present in the conventional picture element PIX illustrated in FIG. 6.

The external driving circuit 6 not only supplies the common electric potential Vcom, and the voltages Vcsh and Vcs1 of the storage capacitor electric potential Vcs but also supplies a gate clock signal GCK and a gate start pulse GSP to the gate driver 3, and further supplies a source clock signal SCK, a source start pulse SSP, and display data DA to the source driver 4.

A source switch SW (SW1 through SW2) is provided between a data signal output terminal of the source driver 4 and the source line SL. Note that the present embodiment describes an example in which the display device is driven by an SSD (Source Sharing Drive) method, and it is assumed that a source switch SW is provided between the data signal output terminal and a plurality of source lines SL corresponding to R, G and B data signals. Such a configuration is illustrated, in a simplified manner, in FIG. 3. According to the SSD method, for each of the horizontal periods, a set of R, G and B data signals are supplied, by a time-sharing method, from the respective data signal output terminals which are allocated to the set of R, G and B data signals to respective source lines SL via respective branch source switches SW. In a case where the display device is driven by a method other than the SSD method, the display device does not necessarily include the source switches SW. In this case, the display device is, for example, configured such that an output amplifier of the source driver 4 switches between a state indicating that the output amplifier is in an output enable state and a state indicating that the output amplifier is in an output disable state.

Figure 5:
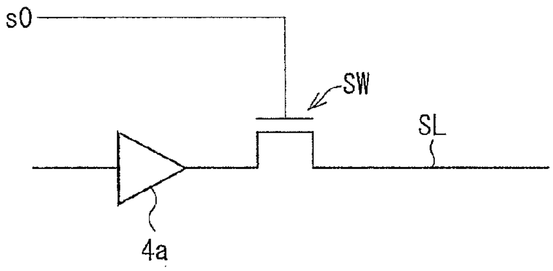
FIG. 5 is a circuit diagram showing a connection relationship of a switch with its periphery, which are included in the display device of FIG. 1.

As shown in FIG. 5, the source switch SW is constituted by, for example, a TFT. Via the source switch SW, an output terminal of an output amplifier 4*a* of the source driver 4 is electrically connected to the source line SL. ON/OFF of the source switch SW is controlled by a control signal s0 supplied from the external driving circuit 6. In this case, typically, the source switch SW is monolithically formed on a display panel. Further, typically, the source driver 4 is included in an IC. Alternatively, the source driver 4 can be monolithically formed on the display panel. Such configurations are suitably applied to a panel made from, for example, polycrystal silicon, CG silicon or microcrystal silicon.

The source switch SW can also be incorporated into the source driver 4 which is included in an IC. Alternatively, the source switch SW can be provided outside the display panel. Such a configuration is suitably applied to a panel made from amorphous silicon. Examples of the source switch encompass, other than a TFT, a general field effect transistor, and bipolar transistor.

The following describes how the liquid crystal display device 1 operates on startup.

Figure 1:
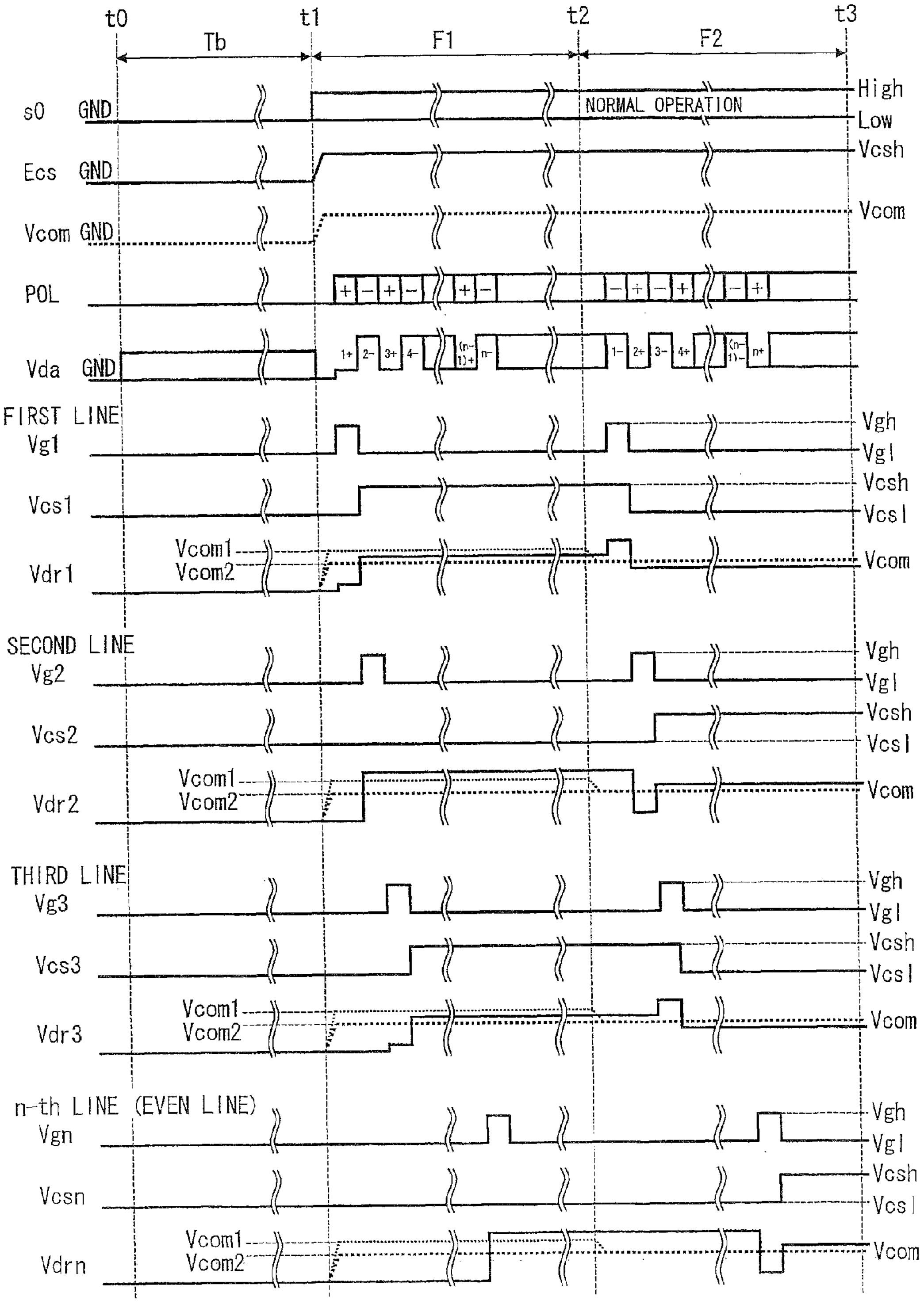
FIG. 1 shows a waveform diagram that explains an operation of a display device in accordance with an embodiment of the present invention.

FIG. 1 shows operation waveforms of the liquid crystal display device 1, which are obtained on startup.

It is assumed that the liquid crystal display device 1 is a normally black liquid crystal display device. FIG. 1 shows driving waveforms of the respective gate lines GL from power turn-on of the liquid crystal display device 1 to the second frame.

Firstly, the liquid crystal display device 1 is turned on at a time t0. After a power turn-on period Tb has elapsed, a display period starts and the control signal $s_0$ of the source switch SW becomes concurrently active (becomes High level in this case). This causes, in a case of the SSD method, the source switch SW to be turned on/off by a time-sharing driving. Note that a source output signal of the source driver 4 becomes active in a case of a configuration where no source switch SW is provided.

The power supply circuit included in the external driving circuit 6 causes a storage capacitor power supply electric potential Ecs and a common electric potential Vcom to have respective rising edges at the time t1.

In the display period, a first frame F1 starts at the time t1. During the first frame F1, a driving is carried out in which (i) display data to be written into picture elements which belong to a first line is transformed, in accordance with a data signal electric potential polarity POL, into display data which is to have a positive polarity with respect to the common electric potential Vcom on and after a second frame F2 which is a normal operating period and (ii) a polarity of display data is alternately reversed, on and after a second line, between any adjacent two lines. The normal operation period is a period during which a normal operation for image display is carried out. For successive frames following the first frame F1, an AC driving is carried out in which polarities of display data which are to be written in respective picture elements PIX in each line are alternately reversed, with respect to the common electric potential Vcom, between (i) during one of any adjacent frames and (ii) during the other of any adjacent frames. Note that a gate line reverse polarity driving is employed here as the AC driving. The first frame F1 is not different from the second frame F2 and following frames in that the data signals are supplied to the picture elements PIX such that (i) the data signal, to be written into the picture elements PIX which belong to an identical line, have an identical first white polarity with respect to the common electric potential Vcom and (ii) there is another line to which picture elements PIX belong and in which line the data signal, to be written into the picture elements PIX, have an identical second write polarity different from the identical first write polarity with respect to the common electric potential Vcom. As described above, the liquid crystal display device 1 is a normally black liquid crystal display device. Therefore, all of the picture elements PIX display black up to a predetermined frame from initiation of the display period.

The picture element electrode 12 is electrically connected to a GND until the time t0 when the liquid crystal display device 1 is turned on, via the TFT 11 which is in high-impedance, the source line SL, and the source switch SW or a source output which is a high-impedance. Therefore, the picture element electrode 12 has an electric potential substantially equal to a GND electric potential until the time t0 when the liquid crystal display device 1 is turned on.

In the present embodiment, the common electric potential Vcom is set to a first common electric potential Vcom 1 during the first frame F1 which is greater than a second common electric potential Vcom2 that is kept on and after the second frame. The storage capacitor wiring CSL also has an electric potential substantially equal to the GND electric potential (Low level) until the time t0 when the liquid crystal display device 1 is turned on. The storage capacitor electric potential Vcs is initially Low level (i) when the liquid crystal display device 1 is turned on and (ii) during the first frame.

Figure 2:
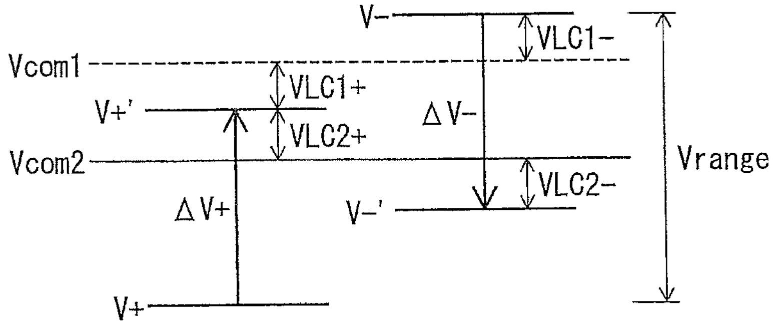
FIG. 2 shows a view that explains a change in picture element electrode electric potential due to the operation of FIG. 1.

During a selection period for selecting picture elements PIX, during which a gate high electric potential Vgh is supplied as a scanning signal Vg1 to the gate line GL1, a data signal electric potential Vda for black display is supplied to the picture element electrode 12. The data signal electric potential Vda becomes positive, during the normal operation period (on and after the time t2), with respect to the second common electric potential Vcom2 (later described) which serves as the common electric potential Vcom. As shown in FIG. 2, the data signal electric potential Vda, which has been supplied to the picture element electrode 12 during the selection period, causes a picture element electrode electric potential Vdr to become an electric potential (first electric potential) V+. Note that the electric potential V+ is set lower than the first common electric potential Vcom1. When the scanning signal Vg1 is decreased to a gate low electric potential Vgl so that the selection period ends, a storage capacitor electric potential Vcs1 to be applied to the storage capacitor wiring CSL1 is changed from Low level (Vcsl) to High level (Vcsh). The change in the storage capacitor electric potential Vcs1 causes a picture element electrode electric potential Vdr1 to be raised by ΔV+ to become an electric potential (second electric potential) V+'. A relationship between the first common electric potential Vcom1 and the storage capacitor electric potential Vcs1 is set such that the electric potential V+' is lower than the first common electric potential Vcom1. An electric potential difference (Vcom1−(V+')) that is an absolute value of a difference between the picture element electrode electric potential Vdr1 and the first common electric potential Vcom1 becomes a liquid crystal applied voltage VLC1+ which is a black display level. This allows black display to be carried out with respect to the first line. That is, the liquid crystal applied voltage VLC1+, which is applied to the first line during the first frame F1, i.e., which is applied to odd-numbered lines of the first frame F1, is set, by use of data for black display, to a voltage having a negative write polarity with respect to the first common electric potential Vcom1. The data is data for black display of positive polarity with respect to the second common electric potential Vcom2 during the normal operation period.

For a successive horizontal period of FIG. 1, during a selection period for selecting picture elements PIX, during which the gate high electric potential Vgh is supplied as a scanning signal Vg2 to the gate line GL2 of the second line, a data signal electric potential Vda for black display is supplied to the picture element electrode 12. The data signal electric potential Vda becomes negative, during the normal operation period, with respect to the second common electric potential Vcom2. As shown in FIG. 2, supply of the data signal electric potential Vda, which has been supplied to the picture element electrode 12 during the selection period, causes a picture element electrode electric potential Vdr2 to become an electric potential (third electric potential) V−. Note that the electric potential V− is set greater than the first common electric potential Vcom1. When the scanning signal Vg2 is decreased to the gate low electric potential Vgl so that the selection period ends, a storage capacitor electric potential Vcs2, to be applied to the storage capacitor wiring CSL2 of the second line, does not change, and keeps Low level (Vcsl: for example, GND electric potential). Therefore, the picture element electrode electric potential Vdr2 is not subjected to any decrease. An electric potential difference ((V−)−Vcom1) that is an absolute value of a difference between the picture element electrode electric potential Vdr2 and the first common electric potential Vcom1 becomes a liquid crystal applied voltage VLC1− which is a black display level. This allows black display to be carried out with respect to the second line. That is, the liquid crystal applied voltage VLC1−, which is applied to the second line during the first frame F1, i.e., which is applied to even-numbered lines of the first frame F1, is set, by use of data for black display, to a voltage having a positive write polarity with respect to the first common electric potential Vcom1. The data is data for black display of negative polarity with respect to the second common electric potential Vcom2 during the normal operation period.

Subsequently, for each horizontal period, the picture element electrode electric potentials Vdr of the picture elements PIX which belong to the odd-numbered lines are determined in the same manner as the picture element electrode electric potential Vdr of the picture elements PIX which belong to the first line, and the picture element electrode electric potentials Vdr of the picture elements PIX which belong to even-numbered lines are also determined in the same manner as the picture element electrode electric potential Vdr of the picture elements PIX which belong to the second line.

The second frame F2 starts at the time t2. That is, the normal operation period starts. The control signal $s_0$ remains active.

On and after the second frame F2, the second common electric potential Vcom2 is used as the common electric potential Vcom.

During the selection period for selecting picture elements PIX, during which the gate high electric potential Vgh is supplied as the scanning signal Vg1 to the gate line GL1, the data signal electric potential Vda for black display, which becomes negative, is supplied to the picture element electrode 12. As shown in FIG. 2, the data signal electric potential Vda, which has been supplied to the picture element electrode 12 during the selection period, causes the picture element electrode electric potential Vdr to become an electric potential V−. When the scanning signal Vg1 is decreased to the gate low electric potential Vgl so that the selection period ends, the storage capacitor electric potential Vcs1 to be applied to the storage capacitor wiring CSL1 is changed from High level (Vcsh) to Low level (Vcsl). The change in the storage capacitor electric potential Vcs1 causes the picture element electrode electric potential Vdr1 to be decreased by ΔV− to become an electric potential (fourth electric potential) V−'. A relationship between the second common electric potential Vcom2 and the storage capacitor electric potential Vcs1 is set such that the electric potential V−' is lower than the second common electric potential Vcom2. An electric potential difference (Vcom2−(V−')) that is an absolute value of a difference between the picture element electrode electric potential Vdr1 and the second common electric potential Vcom2 becomes a liquid crystal applied voltage VLC2− which is a black display level. This allows black display to be carried out with respect to the first line. That is, the liquid crystal applied voltage VLC2−, which is applied to the first line during the second frame F2, i.e., which is applied to odd-numbered lines of the second frame F2, is set, by use of data for black display, to a voltage having a negative write polarity with respect to the second common electric potential Vcom2. The data is data for black display of negative polarity with respect to the second common electric potential Vcom2 during the normal operation period.

For the successive horizontal period of FIG. 1, during the selection period for selecting picture elements PIX, during which the gate high electric potential Vgh is supplied as the scanning signal Vg2 to the gate line GL2 of the second line, the data signal electric potential Vda for black display, which becomes positive, is supplied to the picture element electrode 12. As shown in FIG. 2, supply of the data signal electric potential Vda, which has been supplied to the picture element electrode 12 during the selection period, causes a picture element electrode electric potential Vdr to become an electric potential V+. When the scanning signal Vg1 is decreased to the gate low electric potential Vg1 so that the selection period ends, the storage capacitor electric potential Vcs2 to be applied to the storage capacitor wiring CSL2 of the second line is changed from Low level (Vcs1) to High level (Vcsh). The change in the storage capacitor electric potential Vcs2 causes the picture element electrode electric potential Vdr1 to be raised by ΔV+ to become an electric potential V+'. A relationship between the second common electric potential Vcom2 and the storage capacitor electric potential Vcs2 is set such that the electric potential V+' is greater than the second common electric potential Vcom2. An electric potential difference ((V+')−Vcom2) that is an absolute value of a difference between the picture element electrode electric potential Vdr1 and the second common electric potential Vcom2 becomes a liquid crystal applied voltage VLC2+ which is a black display level. This allows black display to be carried out with respect to the second line. That is, the liquid crystal applied voltage VLC2+, which is applied to the second line during the second frame F2, i.e., which is applied to even-numbered lines of the second frame F2, is set, by use of data for black display, to a voltage having a positive write polarity with respect to the second common electric potential Vcom2. The data is data for black display of positive polarity with respect to the second common electric potential Vcom2 during the normal operation period.

Subsequently, for each horizontal period, the picture element electrode electric potentials Vdr of the picture elements PIX which belong to the odd-numbered lines are determined in the same manner as the picture element electrode electric potential Vdr of the picture elements PIX which belong to the first line, and the picture element electrode electric potentials Vdr of the picture elements PIX which belong to even-numbered lines are also determined in the same manner as the picture element electrode electric potential Vdr of the picture elements PIX which belong to the second line. On and after the third frame F3, an operation is carried out on the basis of a principle identical to that of the second frame F2, in which polarities of display data which are to be written in respective picture elements PIX in each line are alternatively reversed, with respect to the common electric potential Vcom, between (i) during one of any adjacent frames and (ii) during the other of any adjacent frames.

Figure 7:
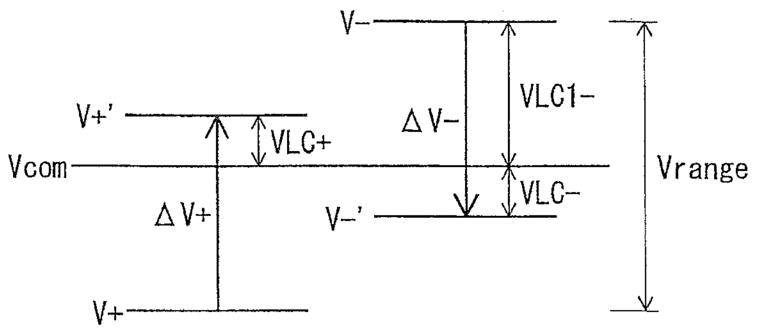
FIG. 7 shows a view that explains a change in picture element electrode electric potential of the picture element of FIG. 6.
Figure 8:
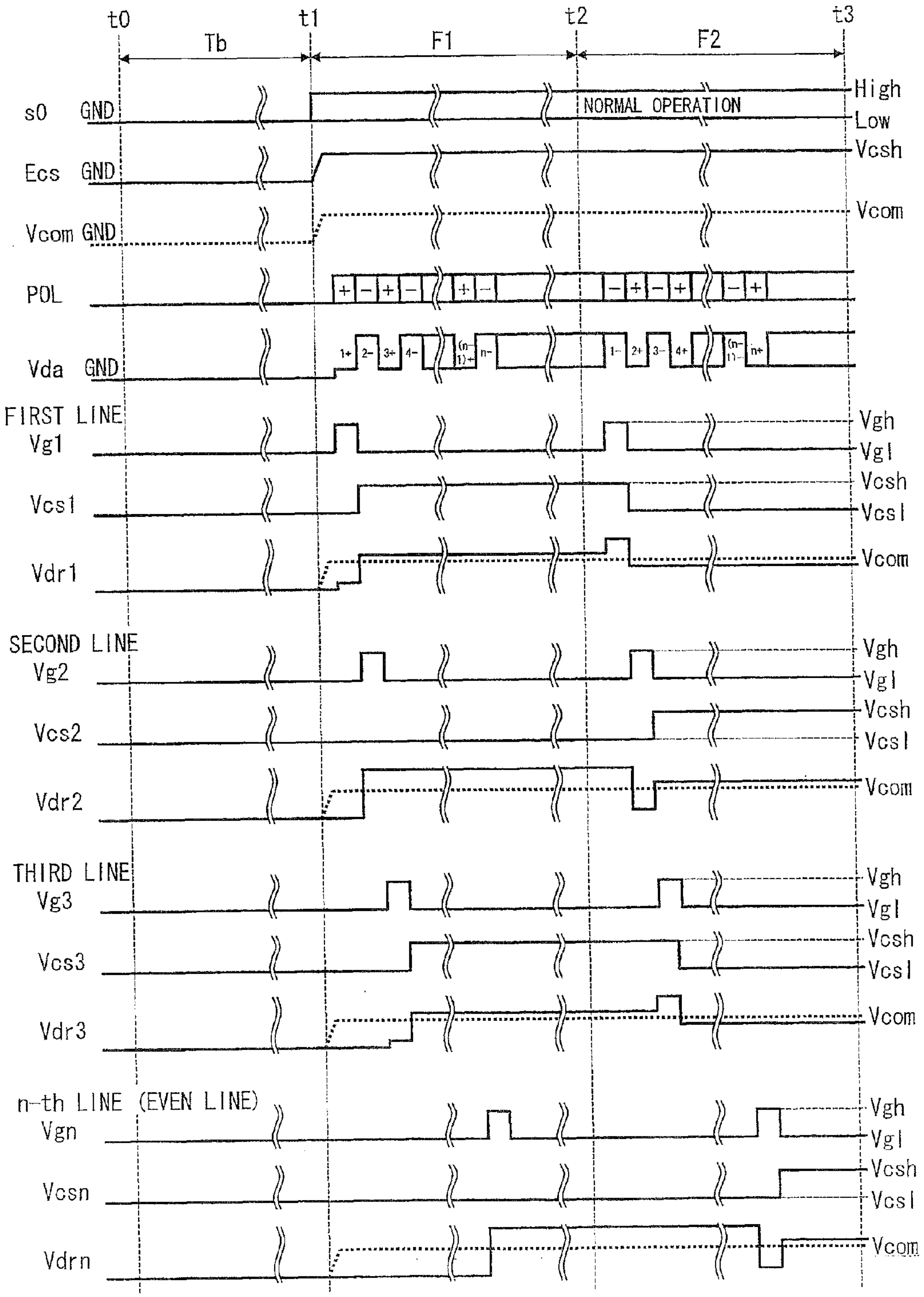
FIG. 8 shows a waveform diagram that explains an operation of the conventional display device including the picture element of FIG. 6.

An electric potential difference ((V−)−Vcom2) shown in FIG. 2 is (i) typically a large value as with that of the electric potential difference ((V−)−Vcom) shown in FIG. 7, and (ii) sufficiently larger than each of the liquid crystal applied voltage VLC2+ and the liquid crystal applied voltage VLC2−, which are applied during black display shown in FIG. 2. Meanwhile, the liquid crystal applied voltage VLC1+ and the liquid crystal applied voltage VLC1−, which are applied during the first frame F1, are smaller than the electric potential difference (Vcom2−(V+)) and the electric potential difference ((V−)−Vcom2). It is therefore possible to set both the liquid crystal applied voltage having a positive polarity during the first frame F1 and the liquid crystal applied voltage having a negative polarity during the first frame F1 to a voltage for black display which is smaller than a voltage for gray display.

According to the present embodiment, even in a case where the storage capacitor electric potential cannot change from High level to Low level during the first frame, the liquid crystal applied voltage, which has the positive write polarity with respect to the first common electric potential, has a value approximate to that of the liquid crystal applied voltage having the negative write polarity with respect to the first common electric potential. This is because the first common electric potential is set, as a common electric potential, between the electric potential V+' and the electric potential V−. According to the conventional technique illustrated in FIG. 7, liquid crystal applied voltages, applied in an odd-numbered line and an even-numbered line, bring data signal electric potentials having different polarities but actually result in having an identical write polarity, so that the picture element electrode electric potential that corresponds to the data signal electric potential having one of the positive and negative polarities is greatly distant from the common electric potential. In contrast, the present embodiment can avoid this kind of problem.

Figure 9:
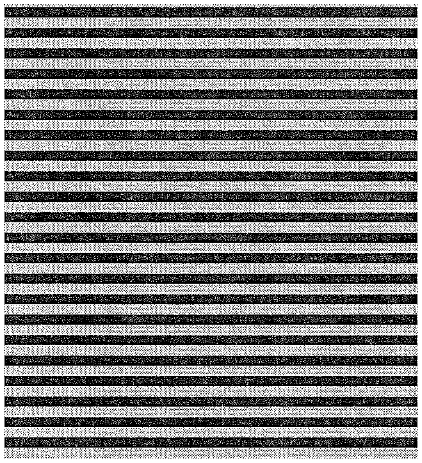
FIG. 9 is a view showing a striped screen caused by the operation of FIG. 8.

It is consequently possible to prevent black and gray stripes of FIG. 9 from being displayed on a display screen during the first frame F1, thereby realizing (i) a display device capable of preventing a deterioration in display quality of the display device, which deterioration occurs when the display device is turned on and (ii) a method for driving the display device.

As is clear from FIG. 2, in a case where a value of the first common electric potential Vcom1 is set between the electric potential V+' and the electric potential V− such that the following inequality is met, the liquid crystal applied voltage VLC1+ and the liquid crystal applied voltage VLC1− evenly approximate to the liquid crystal applied voltage VLC2+ for black display and the liquid crystal applied voltage VLC2− for black display.

$$VLC2+,VLC2-<VLC1+,VLC1-<(V-)-Vcom2 \quad (1)$$

This allows further uniform black display when the display device is turned on. Particularly, it is possible to obtain black display in a case where (i) the display device is a normally black display device and (ii) a liquid crystal applied voltage is not more than a threshold voltage. Therefore, in a case where VLC1+, VLC1−<(V−)−Vcom2, it is possible that (i) the liquid crystal applied voltages VLC2+ and VLC2− and (ii) the liquid crystal applied voltages VLC1+ and VLC1− correspond to an equal black display level. Even in a case where (i) the liquid crystal applied voltages VLC2 and VLC2− and (ii) the liquid crystal applied voltages VLC1+ and VLC1− each have, for example, a gray display level other than the black display level, it is effective in displaying a certain color for a predetermined period after the display device is turned on. This is because (i) the liquid crystal applied voltages VLC2+ and VLC2− and the liquid crystal applied voltages VLC1+ and VLC1− approximate to one another, provided that the inequality (1) is satisfied.

Note that the liquid crystal applied voltage VLC1+ and the liquid crystal applied voltage VLC1− are not necessarily identical to each other, provided that they are sufficient black display levels. However, it is preferable that the liquid crystal applied voltage VLC1+ and the liquid crystal applied voltage VLC1− be identical to each other. This is because picture elements, whose polarities are different from each other, exactly have an identical black display level during the first frame F1. Further, the liquid crystal applied voltage VLC2+ and the liquid crystal applied voltage VLC2− are not necessarily equal to each other. However, it is preferable that they be equal to each other. This is because (i) the liquid crystal applied voltage, whose polarity is positive, has an effective voltage that equals to that of the liquid crystal applied voltage whose polarity is negative and (ii) the picture elements, whose polarities are different from each other, have an identical display luminance during an identical frame.

Though the present embodiment employs a special driving in which the first common electric potential Vcom1 is used as the common electric potential Vcom during the first frame F1, it is not necessary to particularly expand a whole data signal electric potential range Vrange including a range of a data signal electric potential for display of positive polarity and a range of a data signal electric potential for display of negative polarity. This is because the data signal electric potential Vda to be used is the same as that used during the normal operation period. As such, for example, a conventional data signal electric potential range Vrange can be used as it is.

The liquid crystal display device of the present embodiment employs the gate line reverse driving. However, the present embodiment is not limited to this. Alternatively, the liquid crystal display device can generally employ an AC driving in which a data signal electric potential having an identical polarity is written in all picture elements PIX which belong to an identical line.

In order to attain the object, a display device of the present invention is an active matrix display device, including storage capacitor wirings in each of which a storage capacitor electric potential is switched between High level and Low level for each frame, the active matrix display device being capable of switching a common electric potential between a first common electric potential and a second common electric potential, the first common electric potential being greater than the second common electric potential, during the first frame where the storage capacitor electric potential is initially Low level after the active matrix display device is turned on:

(i) the first common electric potential being used as the common electric potential, and data signals being supplied to picture elements such that (a) all the picture elements which belong to an identical line in which line data signals, to be written into the picture elements, have an identical first write polarity with respect to the first common electric potential and (b) there is another line to which picture elements belong and in which line data signals, to be written into the picture elements, have a second write polarity, different from the identical first write polarity, with respect to the first common electric potential, (ii) a picture element electrode electric potential of picture elements for a negative write polarity with respect to the first common electric potential, which picture elements belong to a line, being changed to a second electric potential that is greater than the second common electric potential and that is lower than the first common electric potential, by (a) supplying, to the picture elements of the line, data signals, which have a first electric potential that is lower than the first common electric potential and (b) changing the storage capacitor electric potential of a corresponding storage capacitor wiring from Low level to High level after a selection period of selecting the picture elements for the negative write polarity ends, and (iii) (a) data signals, which have a third electric potential that is greater than the first common electric potential, being supplied to picture elements for a positive write polarity with respect to the first common electric potential, which picture elements belong to a line and (b) the storage capacitor electric potential of the corresponding storage capacitor wiring being kept to be Low level after the selection period of selecting the picture elements for the positive write polarity ends.

According to the present invention, the picture element electrode electric potential of the picture elements for the negative write polarity with respect to the first common electric potential, which picture elements belong to the line, becomes the first electric potential during the selection period. The first electric potential is set lower than the first common electric potential. When the selection period ends, the storage capacitor electric potential is changed from Low level to High level. The change in the storage capacitor electric potential causes the picture element electrode electric potential to be raised to become the second electric potential. The second electric potential is lower than the first common electric potential. An electric potential difference between the picture element electrode electric potential and the first common electric potential becomes a liquid crystal applied voltage having a negative write polarity with respect to the first common electric potential. This allows a display to be carried out during the first frame.

The picture element electrode electric potential of the picture elements for the positive write polarity with respect to the first common electric potential, which picture elements belong to the line, becomes the third electric potential by supply of the data signal electric potential during the selection period. The third electric potential is set greater than the first common electric potential. When the selection period ends, the storage capacitor electric potential still keeps Low level. Therefore, the picture element electrode electric potential is not subjected to any decrease. An electric potential difference between the picture element electrode electric potential and the common electric potential becomes a liquid crystal applied voltage having a positive write polarity with respect to the first common electric potential. This allows a display to be carried out during the first frame.

Accordingly, even in a case where the storage capacitor electric potential cannot change from High level to Low level during the first frame, the liquid crystal applied voltage, which has the positive write polarity with respect to the first common electric potential, has a value approximate to that of the liquid crystal applied voltage having the negative write polarity with respect to the first common electric potential. This is because the first common electric potential is set, as a common electric potential, between the second electric potential and the third electric potential. Therefore, conventionally, lines to which data signal electric potentials having different polarities have been given actually result in having an identical write polarity, so that the picture element electrode electric potential that corresponds to the data signal electric potential having one of the positive and negative polarities is greatly distant from the common electric potential. In contrast, the display device of the present invention can avoid this kind of problem.

It is accordingly possible to prevent stripes from being displayed on a display screen during the first frame. This brings about an effect of producing a display device capable of preventing a deterioration in display quality of the display device, which deterioration is caused when the display device is turned on.

In order to attain the object, the display device of the present invention is configured such that the data signals supplied during the first frame are data signals for black display.

According to the present invention, it is possible to prevent black and gray stripes from being generated when the display device is turned on. Further, it is possible to obtain black display in a case where (i) the display device of the present invention is a normally black display device and (ii) a liquid crystal applied voltage is not more than a threshold voltage. It is therefore easily possible that (i) the liquid crystal applied voltage that is an electric potential difference between the second electric potential and the first common electric potential and (ii) the liquid crystal applied voltage that is an electric potential difference between the third electric potential and the first common electric potential correspond to an equal black display level.

In order to attain the object, the display device of the present invention, on and after a second frame:

(iv) the second common electric potential is used as the common electric potential, and data signals are supplied to picture elements such that (a) all the picture elements which belong to an identical line have an identical first write polarity with respect to the second common electric potential and (b) there is another line to which picture elements belong and in which line data signals, to be written into the picture elements, have a second write polarity, different from the identical first write polarity, with respect to the second common electric potential, so that AC driving is carried out, (v) a picture element electrode electric potential of picture elements for a positive write polarity with respect to the second common electric potential, which picture elements belong to a line, is changed to the second electric potential, by (a) supplying the data signals having the first electric potential to the picture elements of the line and (b) changing the storage capacitor electric potential of a corresponding storage capacitor wiring from Low level to High level after a writing period of writing in the picture elements for the positive polarity ends, and (vi) a picture element electrode electric potential of picture elements for a negative write polarity with respect to the second common electric potential, which picture elements belong to a line, is changed to a fourth electric potential that is lower than the second common electric potential, by (a) supplying the data signals having the third electric potential to the picture elements of the line and (b) changing the storage capacitor electric potential of a corresponding storage capacitor wiring from High level to Low level after the writing period of writing in the picture elements for the negative write polarity ends.

According to the present invention, it is possible to display, on and after the second frame, a certain color identical to that displayed during the first frame, by use of the data signals having the first electric potential and the data signals having the third electric potential that are identical to those of the first frame. This makes it possible to display with high quality during the first frame without extending the data signal electric potential range.

In order to attain the object, the display device of the present invention is configured such that $$VLC2+, VLC2- < VLC1+, VLC1- < \text{(the third electric potential)} - \text{(the second common electric potential)},$$

where the VLC1+ is an absolute value of a difference between the second electric potential and the first common electric potential, the VLC1− is an absolute value of a difference between the third electric potential and the first common electric potential, the VLC2+ is an absolute value of a difference between the second electric potential and the second common electric potential, and the VLC2− is an absolute value of a difference between the fourth electric potential and the second common electric potential.

According to the present invention, the liquid crystal applied voltage VLC1+ and the liquid crystal applied voltage VLC1− evenly approximate to the liquid crystal applied voltage VLC2+ for black display and the liquid crystal applied voltage VLC2− for black display, respectively. This allows further uniform black display when the display device is turned on. Particularly, it is possible to obtain black display in a case where (i) the display device is a normally black display device and (ii) a liquid crystal applied voltage is not more than a threshold voltage. Therefore, in a case where VLC1+, VLC1−<(the third electric potential)−(the second common electric potential), it is possible that (i) the liquid crystal applied voltages VLC2+ and VLC2− and (ii) the liquid crystal applied voltages VLC1+ and VLC1− correspond to an equal black display level. Even in a case where (i) the liquid crystal applied voltages VLC2+ and VLC2− and (ii) the liquid crystal applied voltages VLC1+ and VLC1− each have, for example, a gray display level other than the black display level, it is effective in displaying a certain color for a predetermined period after the display device is turned on. This is because (i) the liquid crystal applied voltages VLC2+ and VLC2− and (ii) the liquid crystal applied voltages VLC1+ and VLC1− approximate to one another, provided that the inequality is satisfied.

In order to attain the object, a method for driving a display device of the present invention is a method for driving an active matrix display device, the active matrix display device, including storage capacitor wirings in each of which a storage capacitor electric potential is switched between High level and Low level for each frame, said method including the steps of:

causing the active matrix display device to be capable of switching a common electric potential between a first common electric potential and a second common electric potential, the first common electric potential being greater than the second common electric potential, during the first frame where the storage capacitor electric potential is initially Low level after the active matrix display device is turned on:

(i) causing the first common electric potential to be used as the common electric potential, and causing data signals to be supplied to picture elements such that (a) all the picture elements which belong to an identical line in which line data signals, to be written into the picture elements, have an identical first write polarity with respect to the first common electric potential and (b) there is another line to which picture elements belong and in which line data signals, to be written into the picture elements, have a second write polarity, different from the identical first write polarity, with respect to the first common electric potential, (ii) causing a picture element electrode electric potential of picture elements for a negative write polarity with respect to the first common electric potential, which picture elements belong to a line, to be changed to a second electric potential that is greater than the second common electric potential and that is lower than the first common electric potential, by (a) supplying, to the picture elements of the line, data signals, which have a first electric potential that is lower than the first common electric potential and (b) changing the storage capacitor electric potential of a corresponding storage capacitor wiring from Low level to High level after a selection period of selecting the picture elements for the negative write polarity ends, and (iii) (a) causing data signals, which have a third electric potential that is greater than the first common electric potential, to be supplied to picture elements for a positive write polarity with respect to the first common electric potential, which picture elements belong to a line and (b) causing the picture element electrode electric potential of the corresponding storage capacitor wiring to be kept to be Low level after the selection period of selecting the picture elements for the positive write polarity ends.

According to the present invention, the picture element electrode electric potential of the picture elements for the negative write polarity with respect to the first common electric potential, which picture elements belong to the line, becomes the first electric potential during the selection period. The first electric potential is set lower than the first common electric potential. When the selection period ends, the storage capacitor electric potential is changed from Low level to High level. The change in the storage capacitor electric potential causes the picture element electrode electric potential to be raised to become the second electric potential. The second electric potential is lower than the first common electric potential. An electric potential difference between the picture element electrode electric potential and the first common electric potential becomes a liquid crystal applied voltage having a negative write polarity with respect to the first common electric potential. This allows a display to be carried out during the first frame.

The picture element electrode electric potential of the picture elements for the positive write polarity with respect to the first common electric potential, which picture elements belong to the line, becomes the third potential by supply of the data signal electric potential during the selection period. The third electric potential is set greater than the first common electric potential. When the selection period ends, the storage capacitor electric potential still keeps Low level. Therefore, the picture element electrode electric potential is not subjected to any decrease. An electric potential difference between the picture element electrode electric potential and the common electric potential becomes a liquid crystal applied voltage having a positive write polarity with respect to the first common electric potential. This allows a display to be carried out during the first frame.

Accordingly, even in a case where the storage capacitor electric potential cannot change from High level to Low level during the first frame, the liquid crystal applied voltage, which has the positive write polarity with respect to the first common electric potential, has a value approximate to that of the liquid crystal applied voltage having the negative write polarity with respect to the first common electric potential. This is because the first common electric potential is set, as a common electric potential, between the second electric potential and the third electric potential. Therefore, conventionally, lines to which data signal electric potentials having different polarities have been given actually have an identical write polarity, so that the picture element electrode electric potential is greatly distant from the common electric potential. In contrast, the display device of the present invention can avoid this kind of problem.

It is accordingly possible to prevent stripes from being displayed on a display screen during the first frame. This brings about an effect of attaining a method for driving a display device capable of preventing a deterioration in display quality of the display device, which deterioration is caused when the display device is turned on.

In order to attain the object, according to the method for driving the display device of the present invention, the data signals supplied during the first frame are data signals for black display.

According to the present invention, it is possible to prevent black and gray stripes from being generated when the display device is turned on. Further, it is possible to obtain black display in a case where (i) the display device of the present invention is a normally black display device and (ii) a liquid crystal applied voltage is not more than a threshold voltage. It is therefore easily possible that (i) the liquid crystal applied voltage that is an electric potential difference between the second electric potential and the first common electric potential and (ii) the liquid crystal applied voltage that is an electric potential difference between the third electric potential and the first common electric potential correspond to an equal black display level.

In order to attain the object, the method for driving the display device of the present invention, further including, on and after a second frame, the steps of:

(iv) causing the second common electric potential to be used as the common electric potential, and causing data signals to be supplied to picture elements such that (a) all the picture elements which belong to an identical line have an identical first write polarity with respect to the second common electric potential and (b) there is another line to which picture elements belong and in which line data signals, to be written into the picture elements, have a second write polarity, different from the identical first write polarity, with respect to the second common electric potential, so that AC driving is carried out, (v) causing a picture element electrode electric potential of picture elements for a positive write polarity with respect to the second common electric potential, which picture elements belong to a line, to be changed to the second electric potential, by (a) supplying the data signals having the first electric potential to the picture elements of the line and (b) changing the storage capacitor electric potential of a corresponding storage capacitor wiring from Low level to High level after a writing period of writing in the picture elements for the positive write polarity ends, and (vi) causing a picture element electrode electric potential of picture elements for a negative write polarity with respect to the second common electric potential, which picture elements belong to a line, to be changed to a fourth electric potential that is lower than the second common electric potential, by (a) supplying the data signals having the third electric potential to the picture elements of the line and (b) changing the storage capacitor electric potential of a corresponding storage capacitor wiring from High level to Low level after the writing period of writing in the picture elements for negative write polarity ends.

According to the present invention, it is possible to display, on and after the second frame, a certain color identical to that displayed during the first frame, by use of the data signals having the first electric potential and the data signals having the third electric potential that are identical to those of the first frame. This makes it possible to display with high quality during the first frame without extending the data signal electric potential range.

In order to attain the object, according to the method for driving the display device of the present invention, $$VLC2+, VLC2- < VLC1+, VLC1- < \text{(the third electric potential)} - \text{(the second common electric potential)}$$

where the VLC1+ is an absolute value of a difference between the second electric potential and the first common electric potential, the VLC1− is an absolute value of a difference between the third electric potential and the first common electric potential, the VLC2+ is an absolute value of a difference between the second electric potential and the second common electric potential, and the VLC2− is an absolute value of a difference between the fourth electric potential and the second common electric potential.

According to the present invention, the liquid crystal applied voltage VLC1+ and the liquid crystal applied voltage VLC1− evenly approximate to the liquid crystal applied voltage VLC2+ for black display and the liquid crystal applied voltage VLC2− for black display, respectively. This allows further uniform black display when the display device is turned on. Particularly, it is possible to obtain black display in a case where (i) the display device is a normally black display device and (ii) a liquid crystal applied voltage is not more than a threshold voltage. Therefore, in a case where VLC1+, VLC1−<(the third electric potential)−(the second common electric potential), it is possible that (i) the liquid crystal applied voltages VLC2+ and VLC2− and (ii) the liquid crystal applied voltages VLC1+ and VLC1− correspond to an equal black display level. Even in a case where (i) the liquid crystal applied voltages VLC2+ and VLC2− and (ii) the liquid crystal applied voltages VLC1+ and VLC1− each have, for example, a gray display level other than the black display level, it is effective in displaying a certain color for a predetermined period after the display device is turned on. This is because (i) the liquid crystal applied voltages VLC2+ and VLC2− and (ii) the liquid crystal applied voltages VLC1+ and VLC1− approximate to one another, provided that the inequality is satisfied.

The present invention is not limited to the description of the embodiments above, and can therefore be modified by a skilled person in the art within the scope of the claims. Namely, an embodiment derived from a proper combination of technical means disclosed in different embodiments is encompassed in the technical scope of the present invention.

INDUSTRIAL APPLICABILITY

The present invention is suitably applicable to various display devices such as a liquid crystal display device.

REFERENCE SIGNS LIST

1: liquid crystal display device (display device)
CSL: storage capacitor wiring
F1: first frame
F2: second frame
PIX: picture element
Vcom: common electric potential
Vcom1: first common electric potential
Vcom2: second common electric potential
Vdr: picture element electrode electric potential
Vcs: storage capacitor electric potential
V+: electric potential (first electric potential)
V+': electric potential (second electric potential)
V−: electric potential (third electric potential)
V−': electric potential (fourth electric potential)

The invention claimed is:

1. An active matrix display device, comprising storage capacitor wirings in each of which a storage capacitor electric potential is switched between High level and Low level for each frame, the active matrix display device being capable of switching a common electric potential between a first common electric potential and a second common electric potential, the first common electric potential being greater than the second common electric potential, during the first frame where the storage capacitor electric potential is initially Low level after the active matrix display device is turned on:

(i) the first common electric potential being used as the common electric potential, and data signals being supplied to picture elements such that (a) all the picture elements which belong to an identical line in which line data signals, to be written into the picture elements, have an identical first write polarity with respect to the first common electric potential and (b) there is another line to which picture elements belong and in which line data signals, to be written into the picture elements, have a second write polarity, different from the identical first write polarity, with respect to the first common electric potential, (ii) a picture element electrode electric potential of picture elements for a negative write polarity with respect to the first common electric potential, which picture elements belong to a line, being changed to a second electric potential that is greater than the second common electric potential and that is lower than the first common electric potential, by (a) supplying, to the picture elements of the line, data signals, which have a first electric potential that is lower than the first common electric potential and (b) changing the storage capacitor electric potential of a corresponding storage capacitor wiring from Low level to High level after a selection period of selecting the picture elements for the negative write polarity ends, and (iii) (a) data signals, which have a third electric potential that is greater than the first common electric potential, being supplied to picture elements for a positive write polarity with respect to the first common electric potential, which picture elements belong to a line and (b) the storage capacitor electric potential of the corresponding storage capacitor wiring being kept to be Low level after the selection period of selecting the picture elements for the positive write polarity ends, and on and after a second frame:

(iv) the second common electric potential is used as the common electric potential, and data signals are supplied to picture elements such that (a) all the picture elements which belong to an identical line have an identical first write polarity with respect to the second common electric potential and (b) there is another line to which picture elements belong and in which line data signals, to be written into the picture elements, have a second write polarity, different from the identical first write polarity, with respect to the second common electric potential, so that AC driving is carried out, (v) a picture element electrode electric potential of picture elements for a positive write polarity with respect to the second common electric potential, which picture elements belong to a line, is changed to the second electric potential, by (a) supplying the data signals having the first electric potential to the picture elements of the line and (b) changing the storage capacitor electric potential of a corresponding storage capacitor wiring from Low level to High level after a writing period of writing in the picture elements for the positive polarity ends, and (vi) a picture element electrode electric potential of picture elements for a negative write polarity with respect to the second common electric potential, which picture elements belong to a line, is changed to a fourth electric potential that is lower than the second common electric potential, by (a) supplying the data signals having the third electric potential to the picture elements of the line and (b) changing the storage capacitor electric potential of a corresponding storage capacitor wiring from High level to Low level after the writing period of writing in the picture elements for the negative write polarity ends, wherein, VLC2+,VLC2−<VLC1+,VLC1−<(the third electric potential)−(the second common electric potential), where the VLC1+ is an absolute value of a difference between the second electric potential and the first common electric potential, the VLC1− is an absolute value of a difference between the third electric potential and the first common electric potential, the VLC2+ is an absolute value of a difference between the second electric potential and the second common electric potential, and the VLC2− is an absolute value of a difference between the fourth electric potential and the second common electric potential.

2. The active matrix display device as set forth in claim 1, wherein:

the data signals supplied during the first frame are data signals for black display.

3. A method for driving an active matrix display device, the active matrix display device, comprising storage capacitor wirings in each of which a storage capacitor electric potential is switched between High level and Low level for each frame, said method comprising the steps of:

causing the active matrix display device to be capable of switching a common electric potential between a first common electric potential and a second common electric potential, the first common electric potential being greater than the second common electric potential, during the first frame where the storage capacitor electric potential is initially Low level after the active matrix display device is turned on:

(i) causing the first common electric potential to be used as the common electric potential, and causing data signals to be supplied to picture elements such that (a) all the picture elements which belong to an identical line in which line data signals, to be written into the picture elements, have an identical first write polarity with respect to the first common electric potential and (b) there is another line to which picture elements belong and in which line data signals, to be written into the picture elements, have a second write polarity, different from the identical first write polarity, with respect to the first common electric potential, (ii) causing a picture element electrode electric potential of picture elements for a negative write polarity with respect to the first common electric potential, which picture elements belong to a line, to be changed to a second electric potential that is greater than the second common electric potential and that is lower than the first common electric potential, by (a) supplying, to the picture elements of the line, data signals, which have a first electric potential that is lower than the first common electric potential and (b) changing the storage capacitor electric potential of a corresponding storage capacitor wiring from Low level to High level after a selection period of selecting the picture elements for the negative write polarity ends, and (iii) (a) causing data signals, which have a third electric potential that is greater than the first common electric potential, to be supplied to picture elements for a positive write polarity with respect to the first common electric potential, which picture elements belong to a line and (b) causing the picture element electrode electric potential of the corresponding storage capacitor wiring to be kept to be Low level after the selection period of selecting the picture elements for the positive write polarity ends, and on and after a second frame:

(iv) causing the second common electric potential to be used as the common electric potential, and causing data signals to be supplied to picture elements such that (a) all the picture elements which belong to an identical line have an identical first write polarity with respect to the second common electric potential and (b) there is another line to which picture elements belong and in which line data signals, to be written into the picture elements, have a second write polarity, different from the identical first write polarity, with respect to the second common electric potential, so that AC driving is carried out, (v) causing a picture element electrode electric potential of picture elements for a positive write polarity with respect to the second common electric potential, which picture elements belong to a line, to be changed to the second electric potential, by (a) supplying the data signals having the first electric potential to the picture elements of the line and (b) changing the storage capacitor electric potential of a corresponding storage capacitor wiring from Low level to High level after a writing period of writing in the picture elements for the positive write polarity ends, and (vi) causing a picture element electrode electric potential of picture elements for a negative write polarity with respect to the second common electric potential, which picture elements belong to a line, to be changed to a fourth electric potential that is lower than the second common electric potential, by (a) supplying the data signals having the third electric potential to the picture elements of the line and (b) changing the storage capacitor electric potential of a corresponding storage capacitor wiring from High level to Low level after the writing period of writing in the picture elements for the negative write polarity ends, wherein, VLC2+,VLC2−<VLC1+,VLC1−<(the third electric potential)−(the second common electric potential)

where the VLC1+ is an absolute value of a difference between the second electric potential and the first common electric potential, the VLC1− is an absolute value of a difference between the third electric potential and the first common electric potential, the VLC2+ is an absolute value of a difference between the second electric potential and the second common electric potential, and the VLC2− is an absolute value of a difference between the fourth electric potential and the second common electric potential.

4. The method as set forth in claim 3, wherein:

the data signals supplied during the first frame are data signals for black display.

* * * * *